United States Patent
Johnson

Patent Number: 5,322,060
Date of Patent: Jun. 21, 1994

[54] FIRE-RESISTANT SMOKE ESCAPE FACE MASKS

[76] Inventor: A. R. Johnson, 4365 Bocaire Blvd., Boca Raton, Fla. 33487

[21] Appl. No.: 58,775

[22] Filed: May 5, 1993

[51] Int. Cl.⁵ ............................................. A62B 7/10
[52] U.S. Cl. .......................... 128/205.27; 128/205.29; 128/201.25; 128/205.12
[58] Field of Search .................. 128/201.22, 201.23, 128/201.25, 205.12, 205.27, 205.28, 205.29

[56] References Cited

U.S. PATENT DOCUMENTS

| | | | |
|---|---|---|---|
| 2,845,927 | 8/1958 | Hill | 128/206.17 |
| 3,101,709 | 8/1963 | Gruenewaelder | 128/206.12 |
| 3,381,454 | 5/1968 | Sponsel et al. | 128/205.28 |
| 3,664,335 | 5/1972 | Boucher et al. | 128/206.19 |
| 4,032,991 | 7/1977 | Vandeweghe | 128/201.25 |
| 4,231,118 | 11/1980 | Nakagawa | 2/7 |
| 4,297,117 | 10/1981 | Holter et al. | 96/153 |
| 4,382,440 | 5/1983 | Kapp et al. | 128/201.25 |
| 4,407,723 | 10/1983 | MacGregor et al. | 128/201.25 |
| 4,428,907 | 1/1984 | Heijenga et al. | 128/202.22 |
| 4,500,327 | 2/1985 | Nishino et al. | 55/72 |
| 4,572,178 | 2/1986 | Takase et al. | 128/201.25 |
| 4,578,256 | 3/1986 | Nishino et al. | 55/72 |
| 4,604,321 | 8/1986 | Okahara et al. | 428/319.9 |
| 4,643,182 | 2/1987 | Klein | 128/201.25 |
| 5,090,407 | 2/1992 | Lesage et al. | 128/205.28 |
| 5,115,804 | 5/1992 | Brookman | 128/201.25 |

Primary Examiner—Edgar S. Burr
Assistant Examiner—Aaron J. Lewis
Attorney, Agent, or Firm—Hoffmann & Baron

[57] ABSTRACT

A fire-resistant face mask is disclosed. The face mask is made of a flexible breathable porous material impregnated with a first solution containing from about 1.8 to about 11.8% by weight ammonium biborate, from about 1.9 to about 6.9% by weight ammonium phosphate, from about 3.7 to about 13.7% by weight ammonium sulfate, from about 0.02 to about 2.0% by weight sodium dodecyl sulfate and from about 92.58 to about 65.6% by weight water; and a second solution containing from about 35% to about 65% by weight lanolin, from about 64.95 to about 30% by weight water and from about 0.05 to about 5.0% by weight lemon fragrance. The mask is breathable and has adsorption capacity for capturing smoke particles, other particulates and for filtering gases. A method of making and using the mask is also disclosed.

6 Claims, 2 Drawing Sheets

FIRE-RESISTANT SMOKE ESCAPE FACE MASKS

BACKGROUND OF THE INVENTION

The present invention relates to fire-resistant face masks capable of capturing smoke particles, particulates and filtering gases. The fire-resistant masks extend the amount of time available for escape from a fire and/or smoke emergency situation and other emergency situations involving particulates and noxious gases and/or fumes.

Various types of apparatus are presently used to provide protection to escaping victims of fire, smoke, noxious fumes and similar emergency conditions. Prior escape masks include respiratory devices, surgical-type face masks and protective face and head gear.

Prior respiratory devices used by rescue squads include breathing filters, oxygen apparatus and respiratory-type masks having an air filtering unit. These respiratory devices are designed for multiple use and are consequently relatively complicated in construction and mechanical operation. In addition, they are expensive, cumbersome to store and have proven complicated for an untrained person to use under emergency conditions. The high cost of respiratory devices prohibit their availability on a wide spread basis for most buildings. This high cost makes it impractical for providing each building occupant with a respiratory device in case of a fire or smoke emergency. Furthermore, even if respiratory devices could be made readily available to building occupants, such equipment would have to be periodically checked and maintained to insure reliable operation when needed.

Recently, attempts have been made to develop respiratory devices which are less expensive and complicated in construction. For example, U.S. Pat. No. 2,845,927 to Hill, discloses a face mask frame which is fitted with a filter element. The filter element is a mat or pad of any suitable porous material. The pad may be made of cotton woven gauze or other fibers, or a felted mat of fibrous glass, natural or synthetic fiber or combinations of these materials. In addition, the pad can be made of terry cloth, natural or artificial sponge, foam latex or polyurethane foam. The filter element is not treated with any chemical compounds nor is the filter element moistened in any way. These masks have proved inadequate because, the filter element provides minimal protection from smoke and gas inhalation. The pad is both untreated and unmoistened, therefore, its filtering capabilities are only as good as its materials of construction.

U.S. Pat. No. 3,101,709 to Gruenewaelder, discloses a filtering element made of a foamed polyurethane sponge. A quaternary ammonium compound is added to the sponge for destroying macroorganisms and microorganisms, such as airborne bacteria. This mask protects the user from inhaling macroorganisms and microorganisms. Additionally, the mask is designed to destroy any macroorganisms and microorganisms that may be exhaled by the user. There is no indication that this mask would be effective in filtering smoke and gases generated during a smoke or fire emergency.

U.S. Pat. No. 3,664,335 to Boucher, et al., discloses a surgical face mask containing an antiseptic solution of quaternary compounds. The surgical face mask is soaked in the quaternary compounds prior to assembling the layers of the filter mat into a flexible porous pad. Amino acid sulphates such as Cytox may also be used as antiseptics. The masks are used to provide protection against contamination from airborne bacteria. There is no indication that this mask would be effective in filtering smoke and gases generated during a smoke or fire emergency.

U.S. Pat. No. 4,032,991 to Vandeweghe, discloses an envelope made of transparent fire-resistant sheet material having a portion enclosing a premoistened porous face mask. The face mask can be made of plies of woven fabric or other suitable porous material. The face mask portion is moistened with water or other liquid for trapping smoke particles and cooling the air passing into the nose and mouth of the wearer. In order to provide further smoke and noxious fume filtering capability, the mask may have granulated carbon particles or other filtering agents disposed between the fabric plies which make up the mask. These masks have proved undesirable due to shifting of the granulated carbon or other filtering agents disposed between the fabric plies. This shifting causes uneven and inadequate absorption of smoke particles.

U.S. Pat. No. 4,231,118 to Nakagawa, discloses a fire and smoke hood. The hood has a mouth piece portion in the front of the hood which is made of a poison absorbing agent. The poison absorbing agent can be activated carbon, zeolite, and Dowsonite. The poison absorbing agent is covered with or contained within an adiabatic non-woven fiber layer. The activated carbon, zeolite, and Dowsonite may be used separately or in combination in the mouth piece area. In addition, a carbon monoxide absorption agent may be used such as alumina hydrate which comprises $Al_2O_3$, $SiO_2$, NaO, $Fe_2O_3$ and $TiO_2$. Both the hood and the mouth piece are formed of non-flammable materials. The mouth piece absorbs smoke and poisonous gases. However, the absorption of smoke is uneven and inadequate due to shifting of the absorption material within the mouth piece.

U.S. Pat. No. 4,297,117 to Holter et al., discloses a fire-proof respiratory face mask made of two layers of a fleece-like or felted material reinforced with an adsorption material. The adsorption material consists of soda lime, active carbon dust, copper dust and/or manganese dioxide dust. The adsorption material is deposited on a base material made of expanded calcium-aluminum-silicate. The particles of the base material are surrounded with a layer of soda lime and a layer of active carbon, as well as a layer of copper dust soaked into a caustic soda solution and/or a layer of manganese dioxide dust. The ceramic fibers extend through the adsorption material and link the fleece-like materials together. The fleece-like material should be made of ceramic fibers. The ceramic fibers have good filter properties and a high heat insulating efficiency. Dust and drops of liquids will be retained in the filter because of the ceramic fibers filter properties. Noxious gases will be retained by the adsorption materials. The masks are complicated in their construction. The ceramic fibers must be situated in such a way that the layers of the mask are linked with each other through the layer of base material. If this is not accomplished the smoke absorbing material shifts, resulting in uneven filtering.

While there have been attempts to develop escape devices and masks which are effective in capturing smoke particles, particulate and filtering gases, these prior art devices often lack the efficiency necessary for practical and wide scale implementation. Typical problems encountered in using fire escape masks and devices include inadequate filtering of smoke particles, particulates and gases, complicated construction causing decreased utility in emergency situations, costly maintenance and testing for proper operation, inadequate fire-resistance of the materials of construction and shifting of the smoke absorption materials within the mask. Consequently, there is a need for alternative fire-resistant face masks for economically and uniformly capturing smoke particles, other particulates and filtering gases.

It is therefore an object of the present invention to provide a disposable one-use, low cost smoke escape face mask capable of capturing smoke particles and particulates and for filtering gases.

It is further an object of the present invention to provide a highly fire-resistant escape face mask for use in various forms, which extends the amount of time available for escaping from a fire and/or smoke emergency situation and other emergency situations involving particulate and noxious gases and/or fumes.

SUMMARY OF THE INVENTION

These and other objects are achieved by the present invention which provides a fire-resistant smoke escape face mask made of a flexible porous breathable material. The flexible porous material is impregnated with a first solution containing from about 1.8% to about 11.8% by weight ammonium biborate, from about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% by weight water. The fire-resistant mask is further impregnated with a second solution containing from about 35% to about 65% by weight lanolin, from about 64.95% to about 30% by weight water and from about 0.05% to about 5.0% by weight lemon fragrance. The fire-resistant mask of the present invention is breathable and has adsorption capacity. The mask is capable of capturing smoke particles, other particulates and is useful in filtering gases. The flexible porous material may be made from 50% to 100%, five ounce to twenty-five ounce cotton terry cloth or a breathable open cell polyurethane foam having from 10 to 80 openings per square inch. In a preferred embodiment, the fire-resistant mask is a fourteen ounce 100% cotton terry cloth sheet. Alternatively, the mask is most preferably an open cell polyurethane foam pad having from 15 to 30 openings per square inch covered with 100%, seven ounce cotton terry cloth.

In a preferred embodiment, the first solution used to impregnate the flexible porous material contains 6.8 by weight ammonium biborate, 3.9% by weight ammonium phosphate, 8.7% by weight ammonium sulfate, 0.2% by weight sodium dodecyl sulfate and 80.4% by weight water. The second solution contains 50% by weight lanolin, 49.5% by weight water and 0.5% by weight lemon fragrance.

A method of making a fire-resistant smoke escape face mask which is capable of capturing smoke particles, other particulates and is useful in filtering gases is also disclosed. The method includes contacting a breathable flexible porous material with a first solution containing from about 1.8% to about 11.8% by weight ammonium biborate, from about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% by weight water. Preferably, the first solution used to contact the flexible porous material contains 6.8 by weight ammonium biborate, 3.9% by weight ammonium phosphate, 8.7% by weight ammonium sulfate, 0.2% by weight sodium dodecyl sulfate and 80.4% by weight water. The flexible porous material may be made from 50% to 100%, five ounce to twenty-five ounce cotton terry cloth, open cell polyurethane foam having from 10 to 80 openings per square inch or combinations of both materials.

The flexible porous material is contacted with the first solution until it is saturated. The solution is contacted with the flexible porous material from about 0.5 minutes to about 5 minutes. Preferably, contacting is for about 2 minutes After saturation, the flexible porous material is dried, producing a breathable, flexible porous material which is fire-resistant and capable of capturing smoke particles, other particulates and is useful for filtering gases. The saturated flexible porous material is dried for about 25 minutes to about 45 minutes at a temperature from about 130° F. to about 200° F.

After drying, the breathable, flexible porous material is contacted with a second solution containing from about 35% to about 65% by weight lanolin, from about 64.95% to about 30% by weight water and from about 0.05% to about 5.0% by weight lemon fragrance. The lanolin solution is contacted with the breathable, flexible porous material from about 1 minute to about 5 minutes.

In a preferred embodiment, the flexible porous material is contacted with the above-mentioned solutions while being agitated in a washing machine at a speed of about 130 cycles/minutes to about 170 cycles/minutes. In addition, the saturated flexible porous material is dried while being tumbled in a dryer at a speed from about 55 rpms to about 85 rpms.

A method of capturing smoke particles, particulates and filtering gases is also disclosed. The method includes covering a person's nose and mouth with a fire-resistant smoke escape face mask of the present invention. The mask provides a barrier to smoke particles, particulates and gases such that they are impeded from passing into the wearer's lungs. Prior to use the face mask was impregnated with two solutions. The first solution contains from about 1.8% to about 11.8% by weight ammonium biborate, about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% by weight water. The second solution contains from about 35% to about 65% by weight lanolin, from about 64.95% to about 30% by weight water and from about 0.05% to about 5.0% by weight lemon fragrance.

For a better understanding of the present invention, reference is made to the following description, taken together with the accompanying drawings, the scope of which will be pointed out in the appended claims.

DETAILED DESCRIPTION OF THE INVENTION

The present invention is a fire-resistant smoke escape face mask. The face mask is made of a flexible porous material which is breathable and has adsorption capacity. The mask is capable of capturing smoke particles, other particulates and is useful in filtering gases. The breathability and adsorption capacity of the face mask is imparted to the flexible porous material by first impregnating it with a solution made of ammonium biborate, ammonium phosphate, ammonium sulfate, sodium dodecyl sulfate and water. The fire-resistant mask is then impregnated with a second solution made of lanolin, water and lemon fragrance. In addition to adsorption properties, the lanolin/lemon fragrance solution gives the mask a pleasant lemon smell and a soft compliant texture when it is held over the nose and mouth during use.

The escape mask can be held in the hand and placed over the mouth and nose. Alternatively, the mask can be held in place with a strap or an elastic band. When air is inhaled through the mask, the mask captures smoke particles, other particulates and filters certain gases, to protect the lungs and breathing passages of the user. The fire-resistant face mask of the present invention extends the amount of time before unconsciousness from asphyxiation that results during a fire and/or smoke emergency. The mask therefore, provides an extended period of time for safe exit from a fire and/or smoke emergency situation. The present invention is also useful as an escape face mask in other emergency situations involving airborne particulates, noxious gases and/or fumes. The mask would be useful in many manufacturing and industrial facilities. For example, the face mask may be used to filter out dust, vapors, fumes and airborne bacteria.

Figure 1:
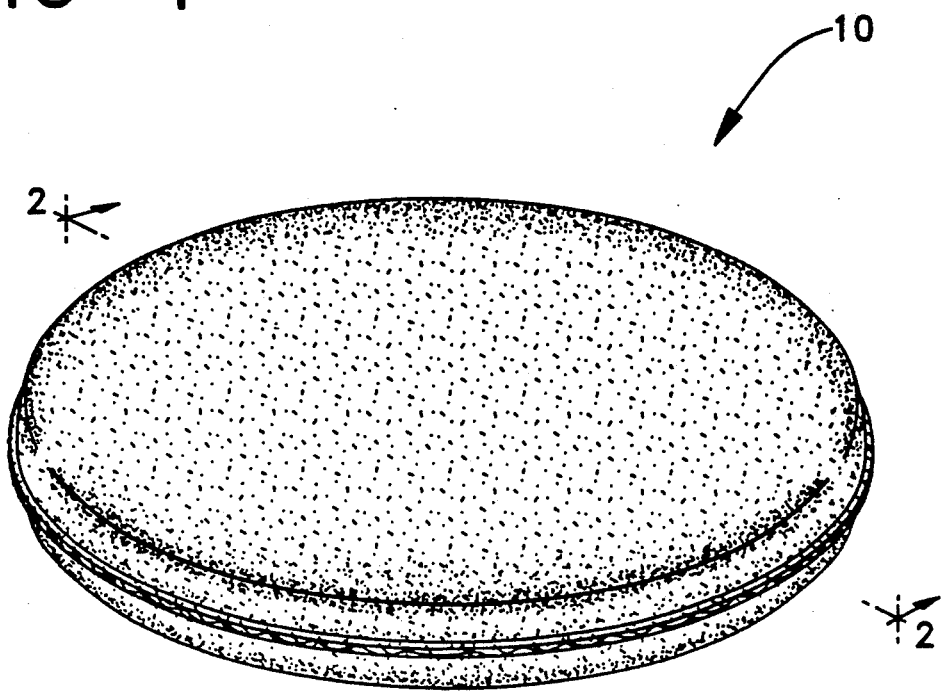
FIG. 1 is an elevated perspective view of one embodiment of the fire-resistant smoke escape face mask of the present invention.

Turning now to the figures, FIG. 1 is an elevated perspective view of one embodiment of the fire-resistant smoke escape face mask of the present invention. FIG. 1 shows a breathable open cell polyurethane foam pad covered with 100% seven ounce terry cloth fabric which has been treated in accordance with the present invention.

Figure 2:
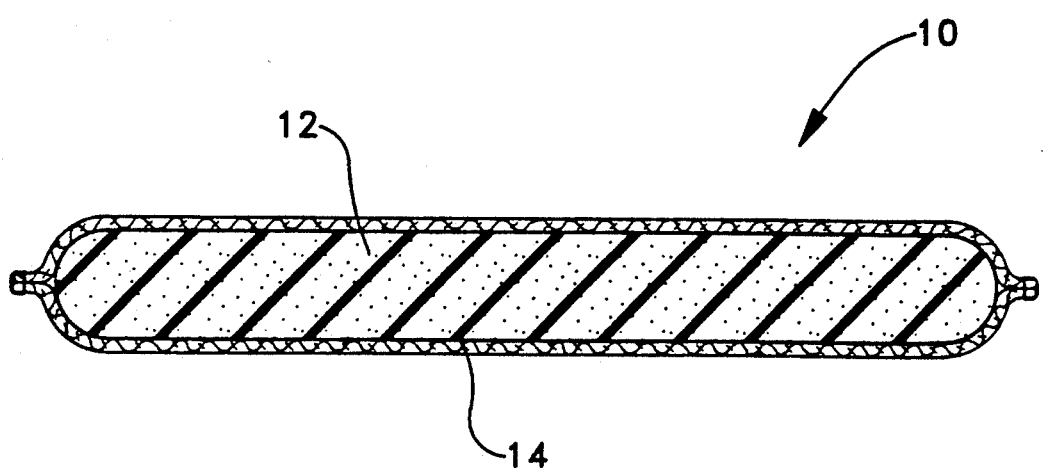
FIG. 2 is a vertical cross-sectional view taken along the line 2—2 of FIG. 1, viewed in the direction of the arrows.

FIG. 2 is a vertical cross-sectional view taken along the line 2—2 of FIG. 1, viewed in the direction of the arrows. As can be seen in FIG. 2 the escape mask 10, which has been treated in accordance with the present invention, is made from a breathable open cell polyurethane foam core 12 covered with a layer of seven ounce terry cloth 100% cotton woven fabric 14.

Figure 3:
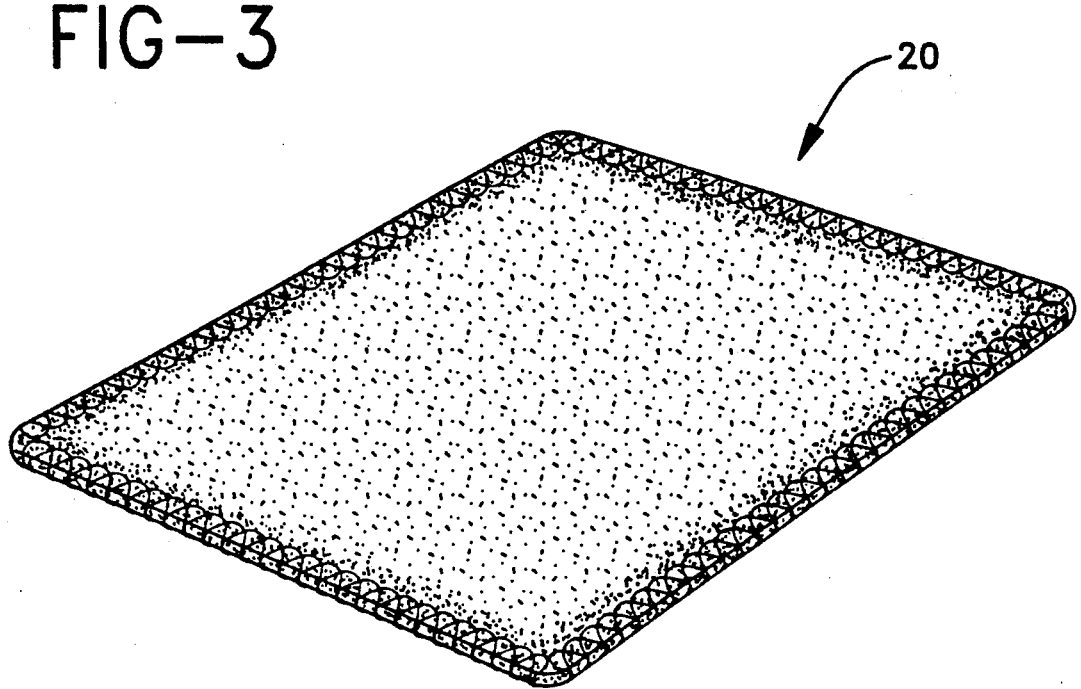
FIG. 3 is an elevational perspective view of a second embodiment of the fire-resistant smoke escape face mask of the present invention.

FIG. 3 shows another embodiment of the fire-resistant escape mask of the present invention. This mask 20 is a 14 ounce 100% cotton terry cloth woven material which has been treated in accordance with the present invention. The mask is made from a sheet of the terry cloth fabric and is approximately 5½×6 inches in size. The size of the pad may vary, but in any case, the pad will be large enough to hold in the hand for placement over the nose and mouth during use.

Figure 4:
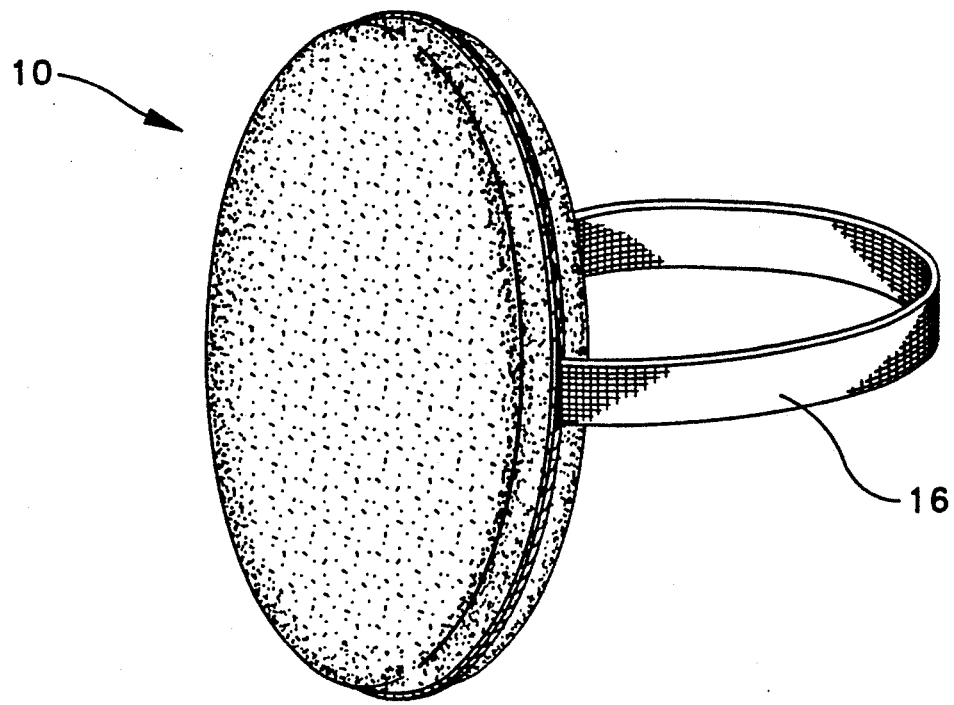
FIG. 4 is the mask of FIG. 1 fitted with an elastic strap.

FIG. 4 is the mask 10 of FIG. 1 that has been fitted with an elastic strap 16 attached to two edges of the mask. The mask is held in place by the strap. The mask covers the nose and mouth area while the strap covers the back of the head. This allows for the hands to be free which may facilitate exiting from an emergency situation.

As shown in FIG. 3, the flexible porous material of the masks may be made from 50% to 100%, five ounce to twenty-five ounce cotton terry cloth. Preferably, the cotton terry cloth is a fourteen ounce 100% cotton woven material, with finished edges. In a most preferred embodiment, as shown in FIG. 1, the fire-resistant mask is an open cell breathable polyurethane foam pad covered with 100% cotton terry cloth. The terry cloth covering the polyurethane foam pad is a seven ounce woven material. The polyurethane pad has from 15 to 30 openings per square inch and is covered with the terry cloth fabric prior to impregnation.

The flexible porous material is impregnated with a first solution containing from about 1.8% to about 11.8% by weight ammonium biborate, from about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% by weight water. In a preferred embodiment, the first solution contains 6.8% by weight ammonium biborate, 3.9% by weight ammonium phosphate, 8.7% by weight ammonium sulfate, 0.2% by weight sodium dodecyl sulfate and 80.4% by weight water. The flexible porous material is impregnated with a second solution containing from about 35% to about 65% by weight lanolin, from about 64.95% to about 30% by weight water and from about 0.05% to about 5.0% by weight lemon fragrance. Preferably the second solution contains 50% by weight lanolin, 49.5% by weight water and 0.5% by weight lemon fragrance.

The present invention also provides a method of making a fire-resistant smoke escape face mask. The fire-resistant smoke escape face masks may be made in a batch method. For example, the masks may be made with the use of commercial type washing and drying machines. Other devices may also be used.

A flexible porous material is first contacted with a solution of ammonium biborate, ammonium phosphate, ammonium sulfate, sodium dodecyl sulfate and water (ammonium compounds/SDS solution) for a sufficient time to saturate the flexible porous material. After saturation the flexible porous material is dried for a time sufficient and at a temperature sufficient to produce a breathable, flexible porous material. The porous material must be breathable such that it allows for the passage of air through the face mask. The ammonium compounds/SDS solution contains from about 1.8% to about 11.8% by weight ammonium biborate, from about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% by weight water. In a preferred embodiment, the ammonium compounds/SDS solution contains 6.8% by weight ammonium biborate, 3.9% by weight ammonium phosphate, 8.7% by weight ammonium sulfate, 0.2% by weight sodium dodecyl sulfate and 80.4% by weight water.

As previously described, the flexible porous material can be made of 50% to 100%, five ounce to twenty-five ounce cotton terry cloth woven material. Alternatively, the mask may be made of an open cell breathable polyurethane foam pad having 10 to 80 openings per square inch which is covered with five ounce to twenty-five ounce, 50% to 100% cotton fabric prior to impregnation with the ammonium compounds/SDS solution. Preferably, the mask is made of 100% fourteen ounce cotton terry cloth. Alternatively, the mask is made of an open cell breathable polyurethane foam pad having 15 to 30 openings per square inch and is covered with seven ounce 100% cotton terry cloth material.

While the size of the masks may vary, they must be large enough to cover the nose and mouth during use. In particular, the terry cloth type mask will be approximately 5½×6 inches in size. The terry cloth covered polyurethane foam pad is generally circular or somewhat oval in shape having a diameter of approximately 4½ to 5 inches. In addition, the pad is approximately ¾ to an inch thick. Other configurations, sizes and shapes are contemplated and are meant to be encompassed by the present invention.

The masks are contacted with the ammonium compounds/SDS solution, from about 0.5 minute to about 5 minutes. Contacting may take place in a washing machine. This contact time allows for saturation of the masks. The contacting may be accompanied by gentle agitation or stirring. In particular, the masks may be agitated, in a washing machine, at a speed of 120 cycles per minute to about 180 cycles per minute.

After saturation and before drying the masks may be rung by hand or spun in a washing machine to facilitate the removal of excess ammonium compounds/SDS solution. If a washing machine is used the masks are spun at a standard spin cycle speed for approximately 1 to 5 minutes. The masks are then dried. The masks may be dried in a dryer. The masks are thoroughly dried to provide a breathable mask. The drying time is for about 25 minutes to about 45 minutes. The masks are dried at a temperature from about 130° F. to about 200° F. Drying may be accompanied by gentle tumbling at approximately 60 rpms to 80 rpms.

After drying, the breathable, flexible porous material is further contacted with a second solution containing from about 35% to about 65% by weight lanolin, from about 64.95% to about 30% by weight water and from about 0.05% to about 5.0% by weight lemon fragrance. Preferably, the solution contains about 50% by weight lanolin, 49.5% by weight water and 0.5% by weight lemon fragrance. The masks are contacted with the lanolin/lemon fragrance solution from about 1 minute to about 5 minutes The fire-resistant face masks are then packaged wet in moisture barrier packages.

A method of capturing smoke particles, particulates and filtering gases is also disclosed. The method includes covering a person's nose and mouth with a fire-resistant smoke escape face mask of the present invention. The mask provides a barrier to smoke particles, particulates and gases such that they are impeded from passing into the wearer's lungs. Prior to use the face mask was impregnated with two solutions. The first solution contains from about 1.8% to about 11.8% by weight ammonium biborate, about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% by weight water. The second solution contains from about 35% to about 65% by weight lanolin, from about 64.95% to about 30% by weight water and from about 0.05% to about 5.0% by weight lemon fragrance.

The face masks are capable of capturing smoke particles, particulates and filtering gases. In addition, the masks cool air when air passes through the mask. While not wishing to be bound by any one theory it is believed that smoke particles and other particulates are trapped in the mask and are not able to pass through the mask into the lungs and air passages of the user. The mask provides an effective barrier to smoke particles. Gases, and CO in particular, may also be trapped in the smoke escape face masks. Alternatively, gases may undergo a chemical reaction upon contact with the ammonium compounds/SDS/lanolin/lemon fragrance impregnated masks which modifies the gases such that they are no longer harmful when breathed into the lungs of the user. In addition to adsorption capability, the lanolin/lemon fragrance treatment provides a fire-resistant face mask that does not irritate the face of the user and has a pleasant lemon fragrance when held over the nose and mouth during use.

EXAMPLES

The following Examples serve to further illustrate the present invention but are not meant in any way to limit or restrict the effective scope of the invention.

EXAMPLE 1

Fire-resistant smoke escape face masks are made according to the formulation listed below. All of the chemicals used in the present invention are readily available from known chemical manufacturers. In preferred embodiments, the masks may be either fourteen ounce 100% cotton terry cloth or polyurethane foam pads having 15 to 30 openings per square inch, covered with seven ounce 100% cotton terry cloth. The masks are made in batches of approximately 400 and 200 masks, respectively.

| Ingredient | % by weight |
|---|---|
| Sodium Dodecyl Sulfate | 0.2 |
| Ammonium Biborate | 6.8 |
| Ammonium Phosphate | 3.9 |
| Ammonium Sulfate | 8.7 |
| Water | 80.4 |

The ingredients may be combined in the order listed above or in any order. This solution is agitated or stirred until all ingredients are dissolved. Preferably, the masks are processed in a commercial washer.

After all of the ingredients are dissolved the masks are added. The masks may be agitated in a washing machine for approximately 1 to 2 minutes until they are completely saturated with the ammonium compounds/SDS solution. After saturation, the escape masks are then rung by hand or spun in a washing machine to remove excess liquid. Preferably, the masks are spun for 2 to 4 minutes on the spin cycle to remove the excess ammonium compounds/SDS solution.

After removing the excess solution the saturated masks are thoroughly dried. The masks can be dried in a commercial dryer or by any other means suitable for drying. If a commercial dryer is used the masks are tumbled at 60-80 rpms and dried at a temperature of 130°-200° F. The drying time is approximately 25-45 minutes.

After drying the masks are then saturated with a second solution of lanolin, water and lemon fragrance having the following formulation: 50% by weight lanolin, 49.5% by weight water and 0.5% by weight lemon fragrance. The smoke escape masks are saturated with the lanolin/lemon fragrance solution. After saturation the masks are packaged wet in moisture barrier packaging.

EXAMPLE 2

The present invention was tested for its ability to capture smoke particles and filter CO. Fire-resistant terry cloth (100% cotton) impregnated samples were tested. Two samples were tested. Each sample, (A) and (B), was a 2 inch by 2 inch terry cloth impregnated sample. The face masks were made in accordance with the formulation and method of Example 1.

The samples were subjected to a modified smoke chamber. Smoke was generated at one end of a four (4) foot long chamber. The smoke was allowed to pass through each sample, (A) and (B). The air passing through the samples was constantly analyzed for the presence of smoke particles and gases. The test results are shown in Table 1.

TABLE 1

| Sample | Time (Min.) | Smoke Particles Filtered (%) | CO Filtered (%) |
|---|---|---|---|
| A | 3 | 98 | 95 |
|   | 5 | 95 | 75 |
|   | 15 | 70 | Failure |
| B | 3 | 98 | 95 |
|   | 5 | 97 | 75 |
|   | 15 | 75 | Failure |

The above results, as shown in Table 1, clearly indicate the ability of the fire-resistant smoke escape face mask of the present invention to capture smoke particles and filter gases. The masks of the present invention were able to capture and filter out 70% of the smoke particles generated during the test. These results were obtained even after fifteen minutes of continuous use. In addition, the samples were able to provide greater than five minutes of filtering protection from CO inhalation prior to failure.

These results clearly indicate the ability of the present invention to capture smoke particles and filter certain gases. Use of the present invention extends the amount of time available for escape from a fire and/or smoke emergency situation.

EXAMPLE 3

The fourteen ounce 100% cotton terry cloth fire-resistant smoke escape mask of the present invention was tested. The smoke escape mask was held in place over the mouth and nose of each test subject for the duration of the test. The test was conducted at a fire academy under controlled conditions. The masks were made in accordance with the formulation of Example 1.

The approximate size of the fire building was 35 ft. ×15 ft. and was of conventional residential height. The building was of concrete block construction with a flat poured concrete roof and contained steel doors and steel windows.

The fire burned within a ventilated steel crucible placed in one corner of an unpartitioned room. Fuels used for the fire were: 2 clear white pine 2×4s cut and broken into various sizes, and a small amount of white pine shavings as tinder. The fire was ignited with a small butane lighter. No other accelerants or materials were used. Approximately one third of a bale of aged, moist hay was added to the existing fire to provide particulate smoke.

The monitor used to verify the atmosphere was a Neo-Tronics, portable Exotox-5, five gas monitor, with an internal pump. The monitor measured percent oxygen in air, carbon monoxide in parts per million and hydrogen sulfide in tenths of parts per million. Air samples were taken at the head level of the subjects at a distance of no more than one foot. All readings were taken in real time.

Test conditions were clear and 74 degrees. After the fire was ignited, four subjects entered the room. Their proximity t the fire did not expose them to elevated temperatures. The fire described above was allowed to develop unimpeded. An interior sector was established, by a fire academy instructor, to supervise the subjects, monitor the atmosphere and determine the termination point of the test.

Stratification of smoke and fire gases, at the midpoint of the test reduced visibility in the test room to about fifteen feet at knee level, six feet at chest level and to less than 2 feet at eye level when standing erect. Each subject had some form of eye protection. The eye protection used provided an air tight seal and was of a swimming-goggle type. Each subject utilized the fire-resistant smoke escape mask of the present invention. The atmosphere was monitored and the readings were recorded during the test. Conditions in the test room deteriorated until the $O_2$ level dropped to a minimum level of 19.5%, which was the predetermined termination point of the test.

Three civilians and one firefighter, whose age and vital signs were recorded by a licensed paramedic prior to entry, proceeded into the room as the fire developed. As previously mentioned, the atmosphere was monitored throughout the test. In particular, $O_2$, CO and $H_2S$ levels were measured. A baseline sample, taken prior to the initiation of the fire indicated that the $O_2$% in the air was 20.8%, and the air did not contain any detectable levels of CO or $H_2S$. The baseline recordings are in accordance with expected levels of these components in air. Generally air is approximately 21% $O_2$ and under normal conditions CO and $H_2S$ are not present in detectable amounts. These results are shown in Table 2.

CO is a highly poisonous, odorless, colorless and tasteless gas. CO is also very flammable and burns in air giving of a bright blue flame. CO combines with hemoglobin in the blood to form carboxyhemoglobin. Carboxyhemoglobin is unable to act as an oxygen carrier in the blood. Toxic symptoms of CO poisoning include headache, mental dullness, dizziness, weakness, nausea, vomiting, loss of muscular control, an increase followed by a decrease in pulse and respiratory rates, collapse, unconsciousness and finally death.

$H_2S$ is a poisonous gas with the characteristic odor of rotten eggs. $H_2S$ is flammable and burns in air giving off a pale blue flame. $H_2S$ is extremely hazardous Inhalation results in collapse, coma and death from respiratory failure. Respiratory failure and death may result within a few seconds after one or two inspirations of the gas. $H_2S$ is extremely dangerous since the sense of smell may be fatigued and fail to give warning of high concentrations of the gas. Low concentrations of the $H_2S$ produce irritation of the conjunctiva and mucous membranes. Exposure to low concentrations will also cause headache, dizziness, nausea and lassitude.

Due to the highly poisonous and toxic nature of CO and $H_2S$, the amount of these substances that workers can be exposed to is strictly controlled by the Occupational Safety and Health Act (OSHA). OSHA has set Short Term Exposure Limits (STEL) for both CO and $H_2S$. STEL is a 15 minute time weighted average exposure which should not be exceeded at any time during a work day. The STEL for CO is 200 ppm. $H_2S$ has a STEL of 15 ppm.

The STEL for CO was exceeded within the first 4 minutes of the test. The three civilian subjects, although they showed no obvious signs of discomfort, coughing or decreased tolerance, were asked to exit the test. As the subjects left the atmosphere, their vital signs were taken again.

The firefighter volunteered to remain and the test continued. He indicated he felt no adverse affects. During the remainder of the test, the firefighter subject stood upright. The sampling location was adjusted to within 6 inches pf his mouth. At the termination of the test and as the subject left the atmosphere his vital signs were taken again. The total duration of the test was 5 min. 30 sec. The vital signs of the subjects are shown in Table 3.

TABLE 2

ATMOSPHERIC MONITORING RESULTS

| Time | $O_2$ Percent in air | CO in PPM | $H_2S$ in PPM |
|---|---|---|---|
| 10:18:20 | 20.8 | 0 | 0 |
| 10:18:30 | 20.8 | 10 | 0 |
| 10:20:00 | 20.7 | 50 | 0.5 |
| 10:21:30 | 20.7 | 153 | 2.0 |
| 10:21:45 | 20.6 | 163 | 2.5 |
| 10:22:00 | 20.3 | 190 | 3.5 |
| 10:22:30 | 20.5 | 345 | 4.5 |
| 10:23:15 | 20.5 | 253 | 5.0 |
| 10:23:30 | Civilian subjects exit | | |
| 10:23:40 | 20.5 | 333 | 6.0 |
| 10:23:42 | 20.4 | 370 | 6.5 |
| 10:23:44 | 20.2 | 506 | 7.0 |
| 10:23:46 | 20.1 | 552 | 7.5 |
| 10:23:48 | 20.0 | 600 | 8.0 |
| 10:23:50 | 19.5 | 700 | 8.5 |
| 10:24:00 | Test terminated, firefighter subject exits | | |

As described above, the normal atmosphere generally contains 21% $O_2$, 0 ppm CO and 0 ppm $H_2S$. As can be seen from Table 2 beginning at time 10:22:30, which is 4 min. 10 sec. into the test, the level of CO far exceeded OSHA limits.

Although the OSHA STEL for $H_2S$ was not exceeded during the test, the test environment was extremely hostile. Throughout the test and due to the combination of decreased $O_2$ content and increased CO and $H_2S$ levels in the air, it was felt that an unprotected individual could perhaps remain conscious in the test room for approximately one or two inhalations which is approximately 2-3 seconds when breathing normally.

The test was terminated solely upon the decreased $O_2$ levels in the test room. At no time during or after the test did any of the subjects complain of, or display, any difficulty breathing. Further evidence of the subjects level of comfort and ability to breath is obtained by comparing their pre-test vital signs with their post-test vital signs. Table 3 shows that none of the subjects experienced any significant fluctuation in blood pressure or pulse rate. A fluctuation in blood pressure or pulse rate would indicate some level of respiratory distress.

The fire-resistant smoke escape mask of the present invention allowed the test participants to remain in the hostile smoke-filled test environment for over 5 minutes as compared to approximately the time it would take for one or two inhalations before an unprotected individual would be rendered unconscious. As previously described, compliance with safety guidelines created premature test termination which prevented the determination of the full, extended protective time that would be available to a user in a life threatening situation.

TABLE 3

SUBJECT VITAL SIGNS

| Subject | Age | Pre-Test BP and Pulse | Post-Test BP and Pulse |
|---|---|---|---|
| Caucasian Male | 35 | 112/92 78 | 122/92 82 |
| Caucasian Male | 25 | 118/80 80 | 120/80 82 |
| Caucasian Male | 62 | 120/84 82 | 118/82 82 |
| Caucasian Male (firefighter) | 34 | 110/84 92 | 102/80 90 |

EXAMPLE 4

A second test, with 3 subjects, was conducted using the polyurethane foam pad covered with seven ounce 100% cotton terry cloth mask of the present invention. The masks were prepared in accordance with the formulation of Example 1. The fire was allowed to burn freely and the door remained open. Due to slightly elevated temperatures al subjects assumed a kneeling position as recommended by fire safety procedures. The atmosphere of the room and vital signals of the subjects were monitored as previously described. The results are shown below in Tables 4 and 5, respectively.

TABLE 4

ATMOSPHERIC MONITORING RESULTS

| Time | $O_2$ Percent in air | CO in PPM | $H_2S$ in PPM |
|---|---|---|---|
| 10:37:20 | 20.9 | 100 | 2.0 |
| 10:37:45 | 20.4 | 223 | 2.5 |
| 10:38:00 | 20.3 | 300 | 3.5 |
| 10:38:15 | 20.3 | 312 | 4.0 |
| 10:38:30 | 20.2 | 388 | 5.0 |
| 10:39:00 | 20.5 | 350 | 6.0 |
| 10:39:30 | 20.2 | 380 | 6.0 |
| 10:39:45 | 20.0 | 484 | 7.0 |
| 10:40:15 | 20.2 | 400 | 7.0 |
| 10:40:45 | 20.0 | 519 | 8.0 |
| 10:40:50 | Subjects stand up. | | |
| 10:41:00 | 19.9 | 600 | 8.0 |
| 10:41:15 | 19.7 | 670 | 8.5 |
| 10:41:30 | 19.6 | 771 | 8.5 |
| 10:41:45 | 19.5 | 950 | 9.0 |
| 10:41:50 | Test terminated, subjects exit. | | |

As previously described, test conditions for CO far exceeded those set by OSHA. STEL for CO was exceeded within 25 seconds of the start of the test. The test continued for an additional 4 minutes. As previously described, although STEL for $H_2S$ was not exceeded during the test an unprotected subject would experience unconsciousness after one or two inhalations, or within 2-3 seconds when breathing normally. The protected subjects did not display any discomfort during or after the test. As can be seen from Table 5 below, the subjects did not experience any adverse effects as a result of the test.

TABLE 5

SUBJECT VITAL SIGNS

| Subject | Age | Pre-Test BP and Pulse | Post-Test BP and Pulse |
|---|---|---|---|
| Caucasian Male | 35 | 112/92 78 | 120/90 80 |
| Caucasian Male | 62 | 120/84 82 | 120/80 80 |

TABLE 5-continued

| | SUBJECT VITAL SIGNS | | |
|---|---|---|---|
| Subject | Age | Pre-Test BP and Pulse | Post-Test BP and Pulse |
| Caucasian Male | 34 | 110/84 92 | 104/82 92 |

Again, the masks of the present invention allowed the test participants to remain int he hostile test environment for over 4 minutes compared to approximately 2-3 seconds in which an unprotected individual would be rendered unconscious. As previously described, compliance with safety guidelines created premature test termination which prevented the determination of the full, extended, protective time that would be available to a user in a life threatening situation.

While there have been described herein what are presently believed to be the preferred embodiments of the invention, those skilled in the art will realize that changes and modifications may be made thereto without departing from the spirit of the invention and it is intended to claim all such changes and modifications as fall within the true scope of the invention.

I claim:

1. A fire-resistant smoke escape face mask, comprising:
   a flexible breathable porous material impregnated with a first solution comprising from about 1.8% to about 11.8% by weight ammonium biborate, from about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% water; and
   a second solution comprising from about 35% to about 65% by weight lanolin, from about 64.95% to about 30% by weight water and from about 0.05% to about 5.0% by weight lemon fragrance, wherein said impregnated material is breathable and has adsorption capacity for capturing smoke particles and particulates and for filtering gases.

2. The fire-resistant mask of claim 1, wherein said flexible porous material is selected from the group consisting of 50% to 100%, five ounce to twenty-five ounce cotton terry cloth; open cell polyurethane foam having from 10 to 80 openings per square inch and combinations thereof.

3. The fire-resistant mask of claim 1, wherein said flexible porous material is impregnated with a first solution comprising:
   6.8% by weight ammonium biborate, 3.9% by weight ammonium phosphate, 8.7% by weight ammonium sulfate, 0.2% by weight sodium dodecyl sulfate and 80.4% by weight water; and
   a second solution comprising 50% by weight lanolin, 49.5% by weight water and 0.5% by weight lemon fragrance.

4. The fire-resistant mask of claim 2, wherein said flexible porous material is an open cell polyurethane foam having 15 to 30 openings per square inch and is covered with seven ounce 100% cotton terry cloth.

5. The fire-resistant mask of claim 2, wherein said flexible porous material is a 100% fourteen ounce cotton terry cloth.

6. A method of capturing smoke particles, particulates and filtering gases, comprising the steps of:
   providing a fire-resistance smoke escape face mask comprising a breathable flexible porous material impregnated with a first solution comprising from about 1.8% to about 11.8% by weight ammonium biborate, from about 1.9% to about 6.9% by weight ammonium phosphate, from about 3.7% to about 13.7% by weight ammonium sulfate, from about 0.02% to about 2.0% by weight sodium dodecyl sulfate and from about 92.58% to about 65.6% by weight water; and
   a second solution comprising from about 35% to about 65% by weight lanolin, from about 64.95% to about 30% by weight water and from about 0.05% to about 5.0% by weight lemon fragrance;
   covering a person's nose and mouth with said fire-resistant smoke escape face mask to provide a barrier to smoke particles, particulates and gases in air whereby said mask impedes said smoke particles, particulates and gases from passing into said person's lungs and air passageways.

* * * * *